United States Patent
Nott et al.

(10) Patent No.: US 12,147,787 B2
(45) Date of Patent: Nov. 19, 2024

(54) DYNAMIC ROBOT TRAY BY ROBOTIC PROCESSES

(71) Applicant: UiPath, Inc., New York, NY (US)

(72) Inventors: Brandon Nott, Bellevue, WA (US); Florin-Radu Tapus, Bucharest (RO); Mircea-Andrei Grigore, Bucharest (RO)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/140,486

(22) Filed: Jan. 4, 2021

(65) Prior Publication Data
US 2022/0075603 A1 Mar. 10, 2022

Related U.S. Application Data

(60) Provisional application No. 63/075,613, filed on Sep. 8, 2020.

(51) Int. Cl.
*G06F 8/34* (2018.01)

(52) U.S. Cl.
CPC ..................... *G06F 8/34* (2013.01)

(58) Field of Classification Search
CPC . G06F 8/34; G06F 8/38; G06F 3/0482; G06F 9/451; G06F 8/33; G06Q 10/10
See application file for complete search history.

(56) References Cited

U.S. PATENT DOCUMENTS

| | | | |
|---|---|---|---|
| 10,417,249 B1* | 9/2019 | Sadler | G06F 16/9535 |
| 10,735,522 B1* | 8/2020 | Sathianarayanan | G06F 17/18 |
| 10,853,430 B1* | 12/2020 | Gau | G06F 16/958 |
| 11,693,923 B1* | 7/2023 | Pallikonda | G06F 9/451 |
| | | | 706/12 |
| 2012/0192187 A1 | 7/2012 | Mills et al. | |
| 2014/0108985 A1 | 4/2014 | Scott et al. | |
| 2016/0011730 A1 | 1/2016 | Rajasekar et al. | |
| 2017/0052824 A1 | 2/2017 | Sharma et al. | |
| 2017/0147190 A1 | 5/2017 | Twist et al. | |
| 2017/0270431 A1* | 9/2017 | Hosabettu | G06F 9/4881 |
| 2018/0074931 A1* | 3/2018 | Garcia | G06F 11/3414 |
| 2018/0107461 A1* | 4/2018 | Balasubramanian | G06F 8/38 |
| 2018/0143744 A1 | 5/2018 | Movsisyan et al. | |
| 2018/0300414 A1* | 10/2018 | Chen | G06F 16/9535 |
| 2018/0330252 A1* | 11/2018 | Sawano | G06N 3/006 |
| 2019/0079980 A1 | 3/2019 | Mallah et al. | |
| 2019/0087069 A1 | 3/2019 | McCauley | |
| 2019/0089655 A1* | 3/2019 | Uppala | H04L 67/51 |
| 2019/0187958 A1* | 6/2019 | Lee | G06F 8/38 |

(Continued)

OTHER PUBLICATIONS

NPL1 ("Use RPA", ITOM Practitioner Portal, Nov. 22, 2019) (Year: 2019).*

(Continued)

*Primary Examiner* — Chat C Do
*Assistant Examiner* — Noor Alkhateeb
(74) *Attorney, Agent, or Firm* — Volpe Koenig

(57) ABSTRACT

Disclosed herein is a computing device that includes a memory and a processor, which is coupled to the memory. The memory stores processor executable instructions for a robotic process engine. In operation, the robotic process engine generates a robot tray comprising a canvas and dynamically configures the canvas based on inputs. The dynamic configuring includes adding a widget onto the canvas.

19 Claims, 10 Drawing Sheets

(56) References Cited

U.S. PATENT DOCUMENTS

| | | | | |
|---|---|---|---|---|
| 2019/0286474 | A1* | 9/2019 | Sturtivant | G06F 9/547 |
| 2020/0004798 | A1 | 1/2020 | Weinert, Jr. et al. | |
| 2020/0233707 | A1 | 7/2020 | Ramamurthy et al. | |
| 2020/0306970 | A1* | 10/2020 | Latkar | G06F 11/0766 |
| 2020/0387358 | A1* | 12/2020 | Chae | G06F 9/455 |
| 2020/0387550 | A1* | 12/2020 | Cappetta | G06F 16/9538 |
| 2021/0129325 | A1* | 5/2021 | Yu | G06F 9/451 |

OTHER PUBLICATIONS

Automation Anywhere, "Run RPA Bots for Excel," available at https://docs.automationanywhere.com/bundle/integrations/page/enterprise/topics/aae-client/bot-creator/customizing-an-automation-client/run-rpa-bots-for-excel-2019.html (last updated Nov. 13, 2020).

Glushkov, "RPA: configure a workflow," available at https://helpdesk.bitrix24.com/open/11450000/ (Jul. 16, 2020).

Written Opinion and International Search Report for International Application No. PCT/US2021/049376 dated Dec. 8, 2021.

Supplementary European Search Report received in EP Application No. 21801401, dated Jul. 25, 2023, 2 pages.

* cited by examiner

DYNAMIC ROBOT TRAY BY ROBOTIC PROCESSES

BACKGROUND

Design computing platforms enable developers to design, package, and transfer robotic process automation (RPA) workflows to orchestrators of local computing devices. These RPA workflows can be self-contained and used for specific tasks. Conventionally, RPA workflows are presented to users in a single column experience in which any processes or tasks pushed by developers are visible to orchestrators based on categories. Thus, it is desirable to provide an improved experience for viewing and using RPA workflows in the local computing devices.

SUMMARY

According to one or more embodiments, a computing device is provided. The computing device includes a memory and a processor, which is coupled to the memory. The memory stores processor executable instructions for a robotic process engine. In operation, the robotic process engine generates a robot tray comprising a canvas and dynamically configures the canvas based on inputs. The dynamic configuring includes adding a widget onto the canvas.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

Figure 5:
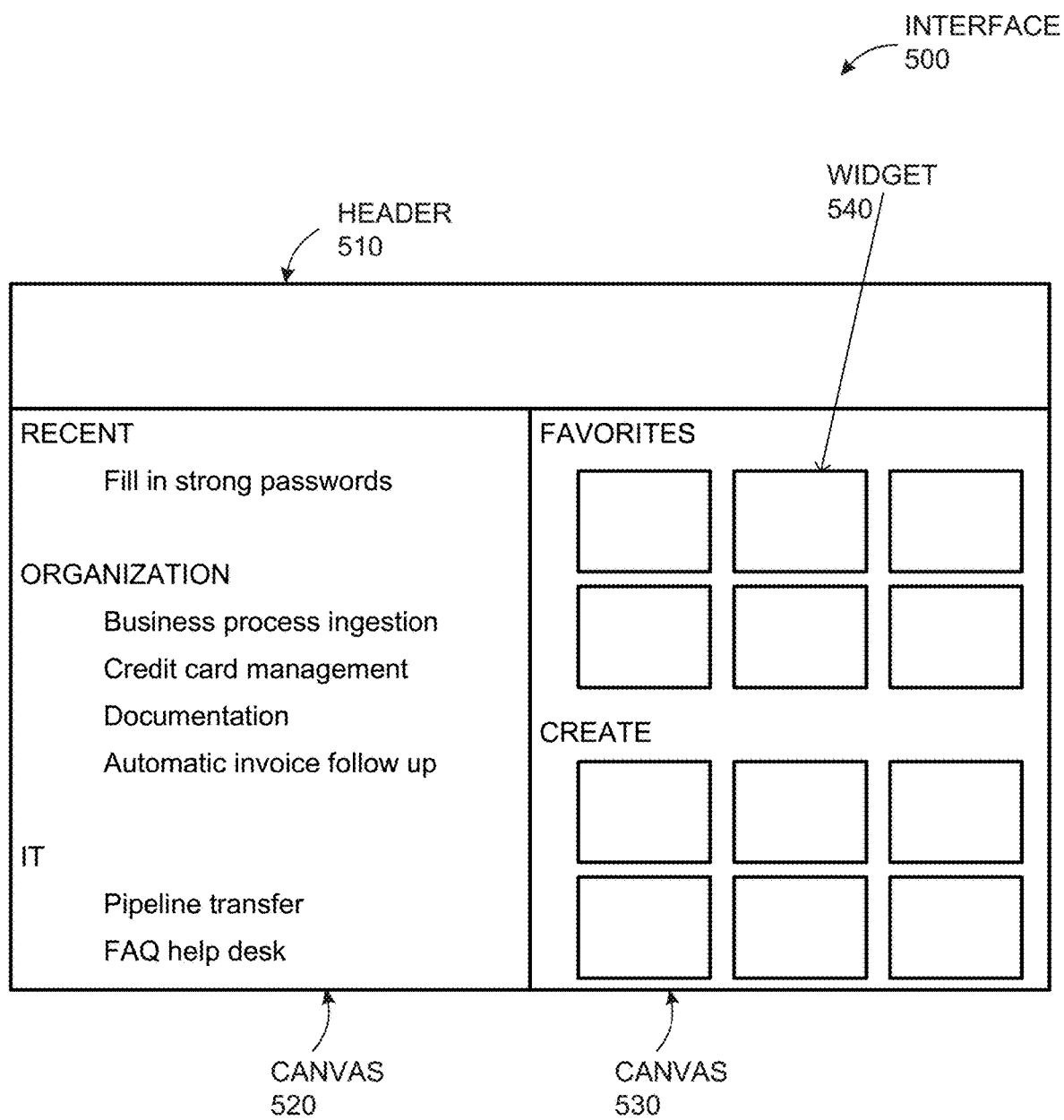
Figure 6:
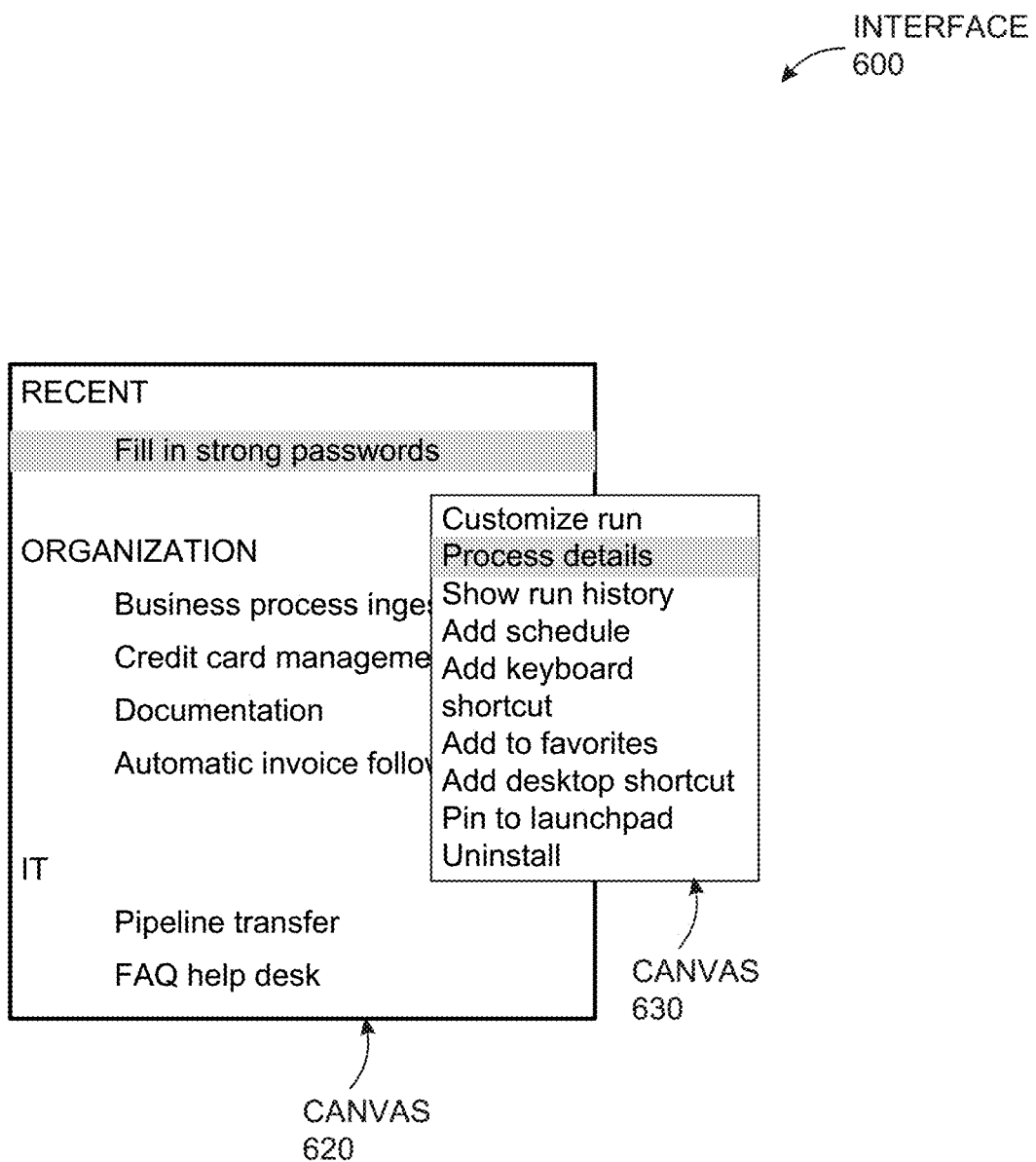
Figure 7:
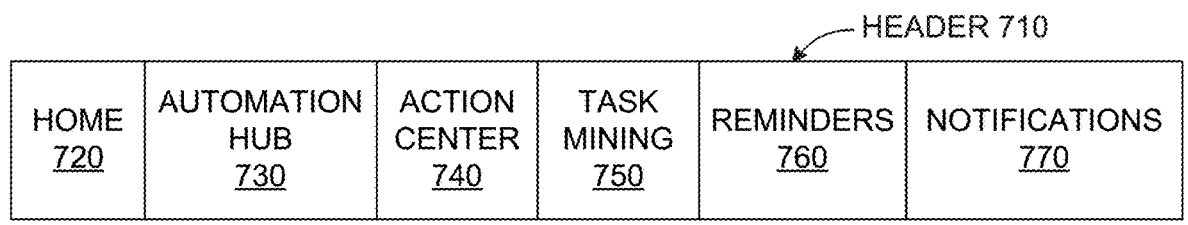

FIG. 5, an interface is shown according to one or more embodiments;

FIG. 6, an interface is shown according to one or more embodiments;

FIG. 7, an interface is shown according to one or more embodiments; and

Figure 8:
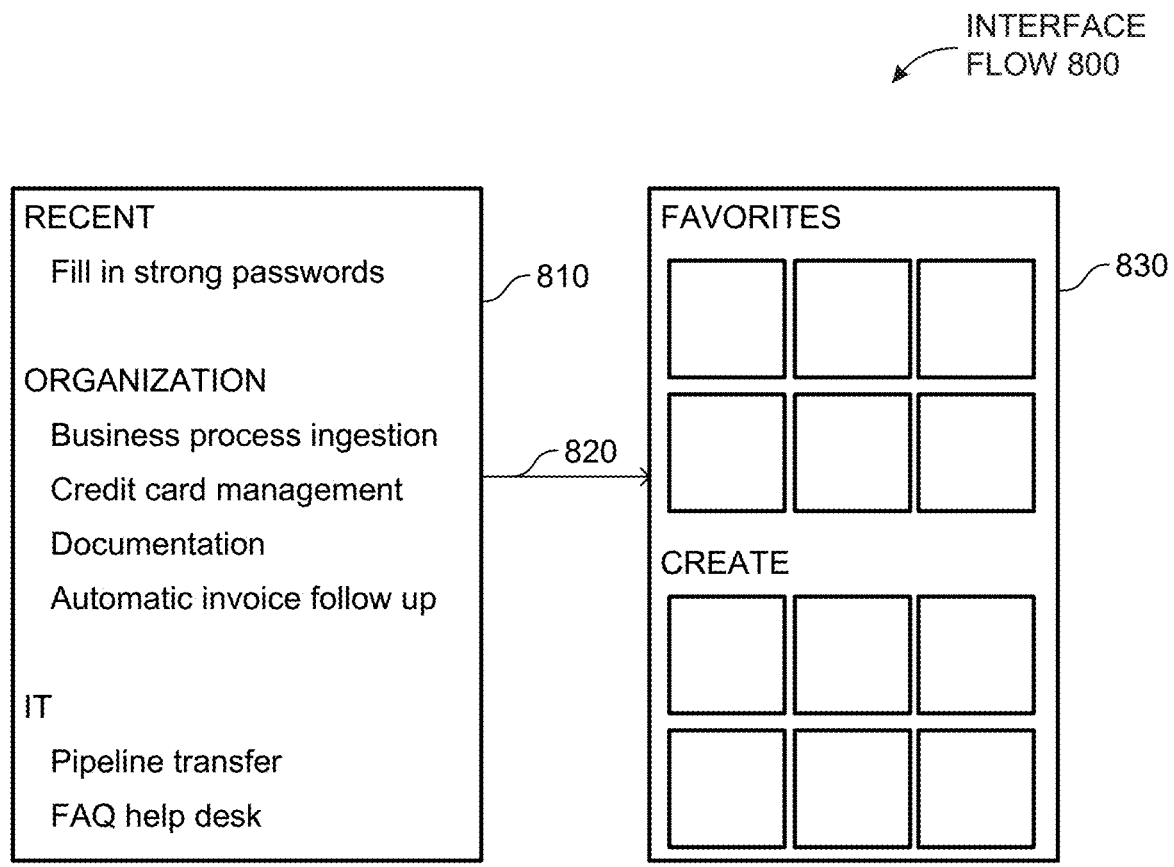

FIG. 8, an interface flow is shown according to one or more embodiments.

DETAILED DESCRIPTION

Disclosed herein is a robotic process engine according to one or more embodiments. The robotic process engine includes software and/or hardware that performs functions of a robotic process automation (RPA). More particularly, the robotic process engine provides a specific configuring and tooling robotic process automation method for an improved experience for viewing and using RPA workflows in local computing devices system. The robotic process engine can be a combination of hardware and software (e.g., processor executable code that is necessarily rooted in the hardware).

In this regard, the improved experience includes providing a user interface (UI), such as a robot tray, where a user can dynamically initiate and monitor one or more RPA workflows. The robot tray includes one or more canvases and one or more widgets. The RPA workflows, generally, include any robot, robotic process, robotic task, robotic workflow, and/or robotic link, along with any other form of software automation. The canvases are spaces within the robot tray for supporting a display of the RPA workflows and/or the widgets. The widgets are separate code created outside of the robot tray to augment an experience of the robot tray. To provide the improved experience, the robot tray enables curation of the RPA workflows and/or the widgets, enables the RPA workflows and/or widgets to link to other RPA workflows and/or widgets, and enables dynamic creation of shortcuts (e.g., such as shortcuts for different workflows, for most used workflows, and for different business areas).

In an example operation, the robotic process engine generates a robot tray comprising a canvas and dynamically configures the canvas based on inputs. The dynamic configuring includes adding a widget onto the canvas. Accordingly, one or more advantages, technical effects, and/or benefits of the robotic process engine and the robot tray can include enabling easy process/task curation and access to selected processes/tasks in a favorites area of the robot tray, providing users with a better experience of a software product without opening the software product directly, and providing a launch pad for processes, tasks, and software products.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
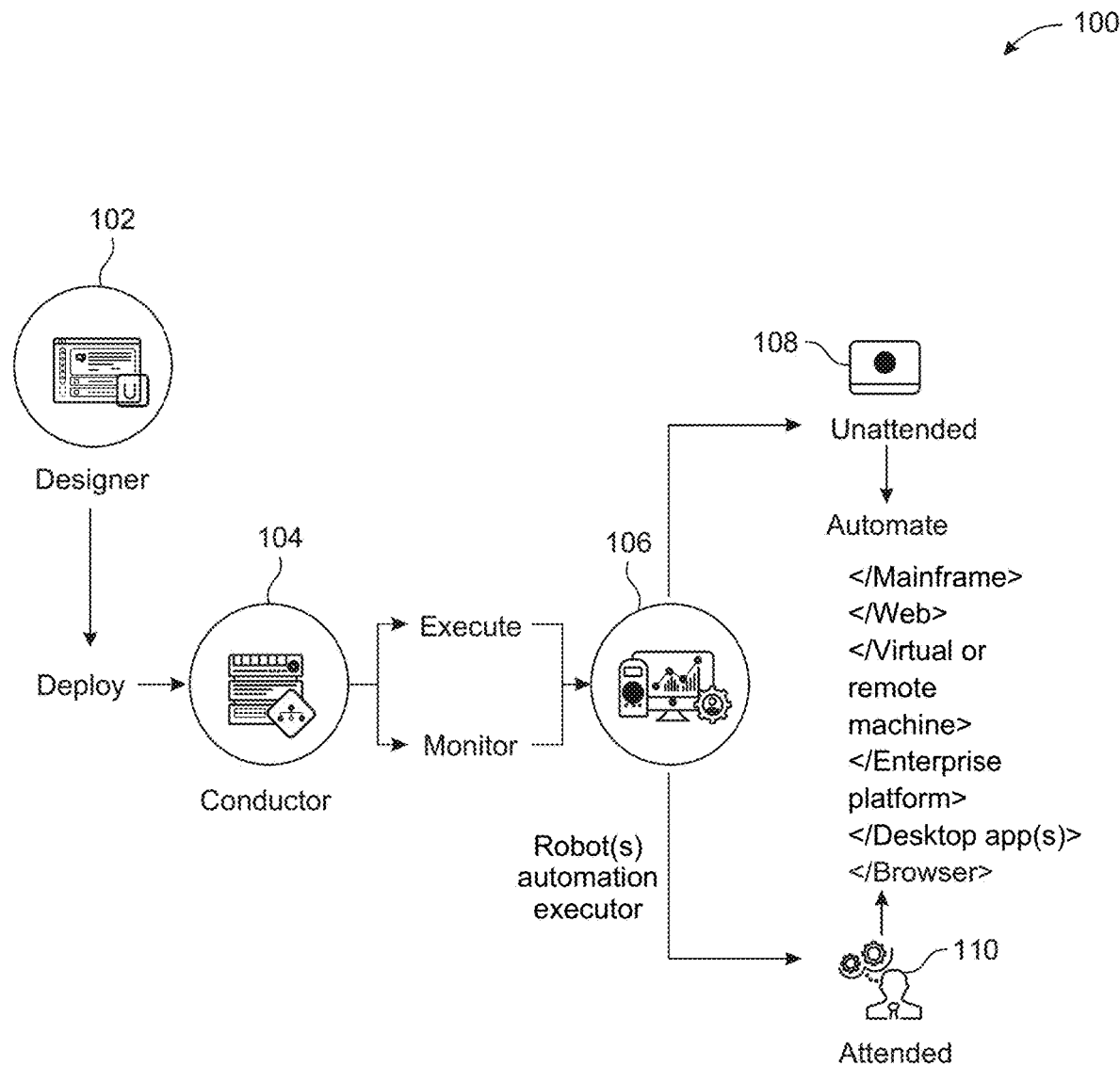
FIG. 1A is an illustration of robotic process automation (RPA) development, design, operation, or execution according to one or more embodiments.

FIG. 1A is an illustration of robotic process automation (RPA) development, design, operation, or execution 100. Designer 102, sometimes referenced as a studio, development, or online platform including one or more engines (e.g., a robotic process engine), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing log-ins, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like (e.g., scripting for unstructured data, such as documents files in any format). Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, online platform, desktop app(s), browser, or the like client, application, or program. Conductor 104 may act as a central or semi-central point to instruct or command a plurality of robots to automate a computing platform (e.g., a design computing platform).

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
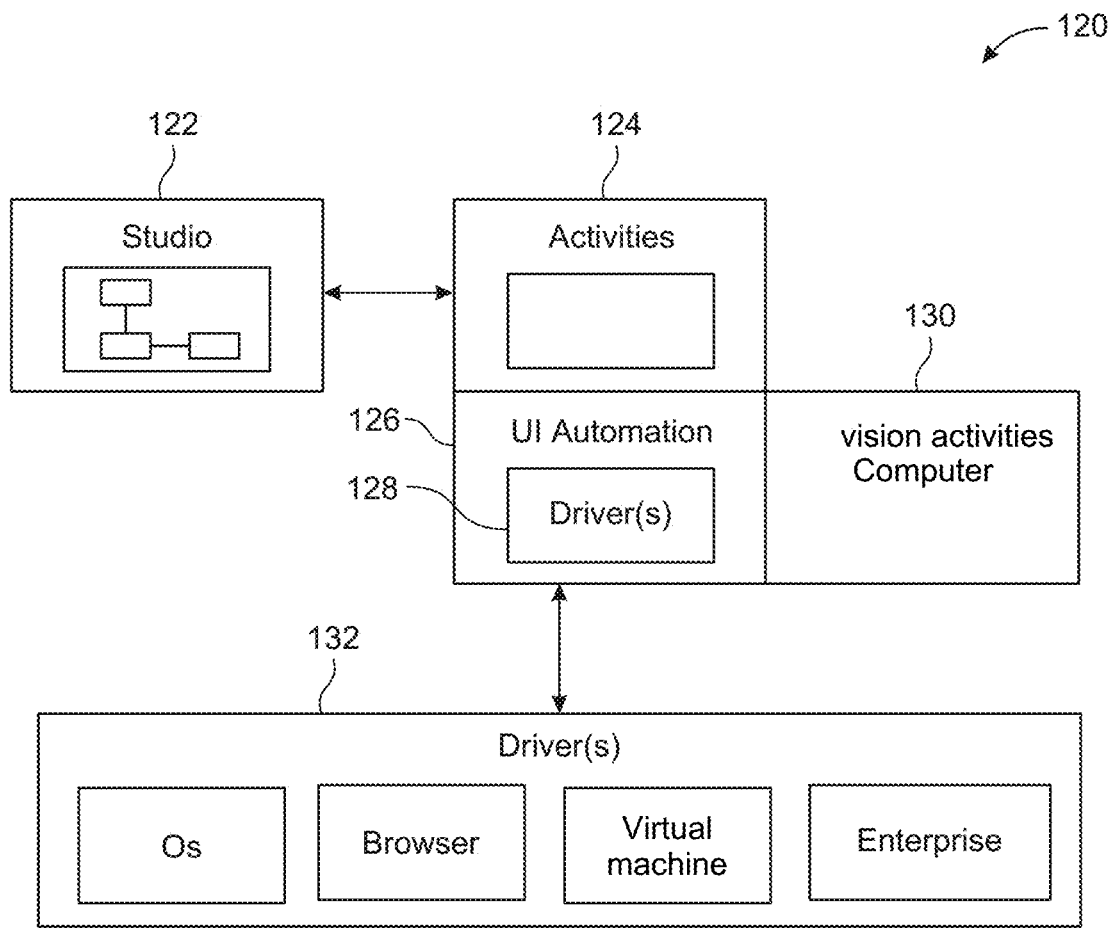
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. UI automation 126 may be performed by a robot on a client using one or more driver(s) components 128. A robot may perform activities using computer vision (CV) activities module or engine 130 (e.g., a robotic process engine). Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

According to one or more embodiments of RPA development, design, operation, or execution 120 of FIG. 1B, the studio component or module 122 can design and execute robots and processes. Further, the studio component or module 122 can also be used to design the robots and processes and pass the designed robots and processes to a robotic process engine for execution. Note that the robotic process engine can, thus, execute the designed robots and processes even if the computing environment of the robots and processes does not include the studio component or module 122. In this way, for example, the designed robots and processes can be procured, bought, and/or traded without the need to already have the studio component or module 122 implemented locally. Indeed, the designed robots and processes can be regarded as standalone units of automation that act and behave very much like applications or installers (e.g., The robotic process engine is an "operating system" for the designed robots and processes to be installed and executed within on local computers.

Figure 1C:
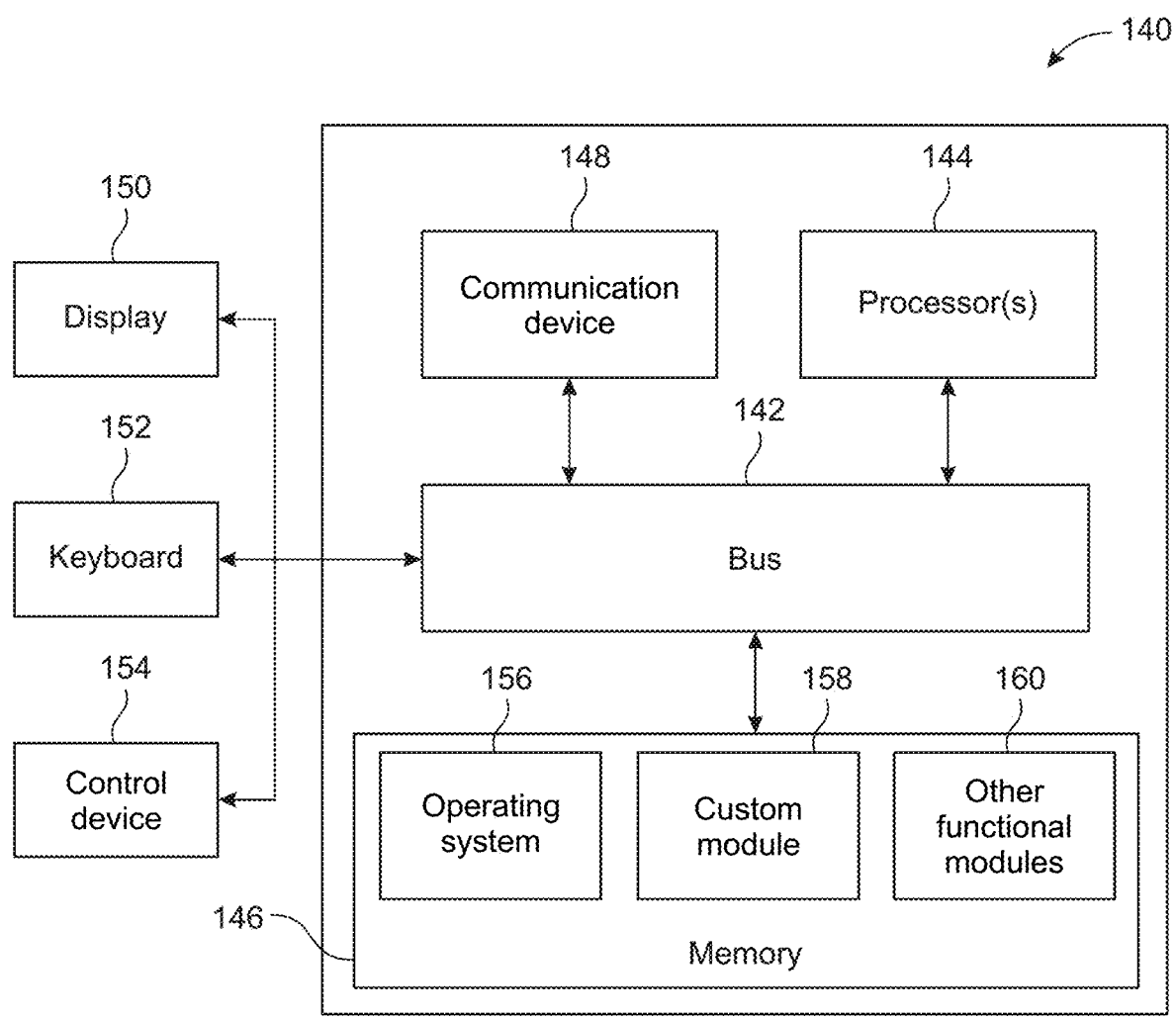
FIG. 1C is an illustration of a computing system or environment according to one or more embodiments.

FIG. 1C is an illustration of a computing system or environment 140 (e.g., hardware supporting an online platform and/or a robotic process engine) that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions (e.g., processor executable instructions of a robotic process engine, along with RPA workflows, widgets, and configurations), commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the robotic process engine can be implemented in one or more of the modules 158 and 160 to provide a specific configuring and tooling robotic process automation method to the computing system or environment 140.

Computing system or environment 140 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
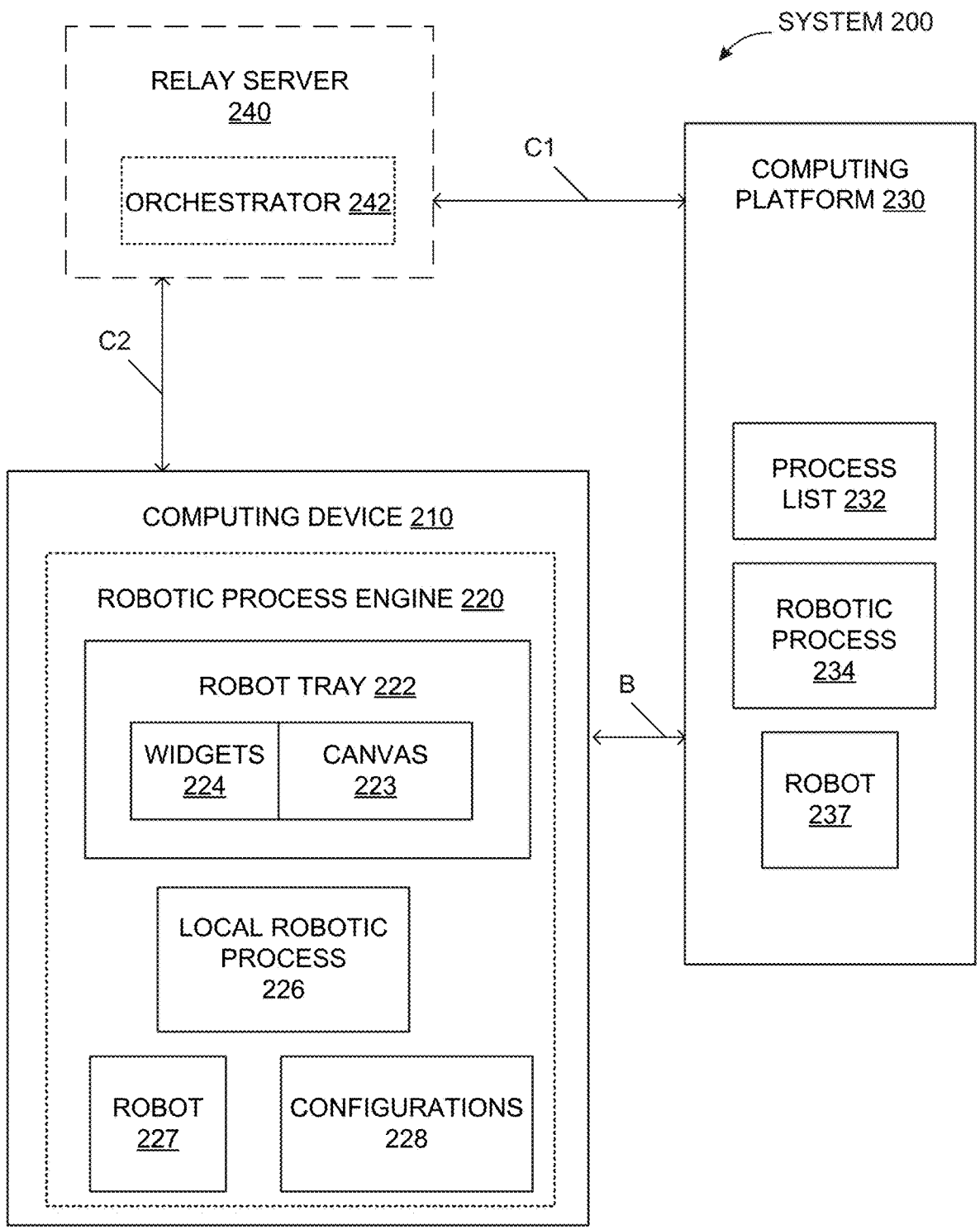
FIG. 2 is an illustration of a system according to one or more embodiments.
Figure 3:
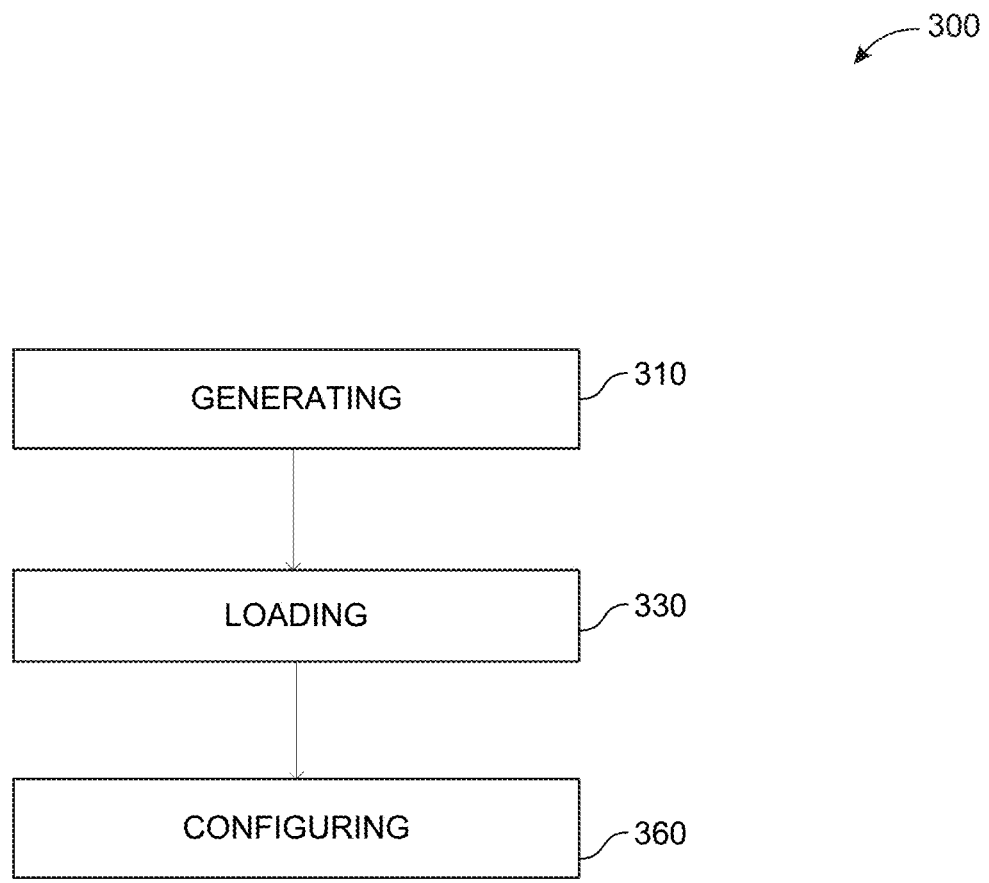
FIG. 3 is a block diagram illustrating a process flow executed by a robotic process engine according to one or more embodiments.

Turning now to FIGS. 2-3, components and operations of the robotic process engine are described according to one or more embodiments. FIG. 2 is an illustration of a system 200 (e.g., software and/or hardware that provides improved experience for viewing and using RPA workflows). As shown in FIG. 2, the system 200 includes a computing device 210 that operates a robotic process engine 220. The robotic process engine 220 includes at least a robot tray 222, at least one canvas 223, at least one widget 224, a local robotic process 226, a robot 227, and a configuration 228. The system 200 includes a computing platform 230 that includes a process list 232, a robotic process 234, and a robot 237. The system 200 includes a relay platform 240 that includes an orchestrator 242, as described herein. Further, while a single block is shown for each item (or component) of the system 200, that single block is representative of one or more of that item (or component), and the singular and plural forms may be used interchangeably herein.

The computing device 210, which is an example of a computing system or environment 140 of FIG. 1, communicates with the computing platform 230 (as shown by the arrow B). The computing device 210 is representative of one or more user devices, each including at least a processor, a memory, and a display with a UI (e.g., the robot tray 220). Examples of the computing device 210 include, but are not limited to, a personal computer, a PDA, a cell phone, a tablet computing device, a mobile device, a desktop device and a smartphone. The computing platform 230 is representative of one or more software-, infrastructure-, platform-based services that provide networks, servers, storage services, operating systems, database services, and security services (e.g., the robotic process engine 220) to the computing device 210.

Note the computing device 210 and the computing platform 230 can optionally communicate via the relay server 240 (as shown by the arrows C1 and C2; a dashed border of the relay server 240 indicates this component as optional). The relay server 240 can be structurally similar to the computing device 210 and/or the computing platform 230 and can have the orchestrator 242 therein. Note also that the arrows B, C1, and C2 within the system 200 are representative of communications transmitted over wired and/or wireless connections, networks, and the like.

Generally, the robotic process engine 220 is software and/or hardware that performs improved experience for viewing and using RPA workflows (e.g., robotic processes 234, robots 23, and/or RPA workflows originated from design computing platforms). For instance, the robotic process engine 220 can acquire the process list 232 and the robotic processes 234 and/or robots 237 associated therewith. In this regard, the robotic process engine 220 of the computing device 210 can download/receive discrete copies of code of that RPA workflows and can display (using the robot tray 222) the widgets 224 representing the provided RPA workflows of the process list 242. The robotic process engine 220 can be optionally executed in multiple iterations across one or more systems, devices, and environments, such as within the computing platform 230 and the relay server 240. For example, while the robotic process engine 220 is shown as local to the computing platform 230, the robotic process engine 220 can also be, or in the alternative, local to the computing platform 230 or a stand-alone hardware/software combination that is in communication with the other components of the system 200. In accordance with one or more embodiments, the improved experience operations enabled by the robot tray 222 and/or the widgets 224 of the robotic process engine can include dynamically configurability that is otherwise previously not available.

The robot tray 222 provides interface framework of functionalities (e.g., the one or more canvases 223 and the one or more widgets 224) where at least a list of RPA workflows (e.g., the robot 227 and the local robotic process 226) and the configurations 228 are shown, accessed, manipulated, and configured (e.g., user can dynamically initiate and monitor one or more RPA workflows). In this way, the robot tray 222 provides functionalities to and extends functionalities of the computing platform 230 and/or the computing device 210. The robot tray 222 provides and extends functionalities by obtaining and utilizing the process list 232 and the like.

The robot tray 222 can be considered a UI that visually displays shapes in multiple dimensions for UI robot development and runtime in relation to a CV operation or ML model. The canvases 223 are spaces within the robot tray 222 for supporting a display of the RPA workflows and/or the widgets 224. The widgets 224 are separate code created outside of the robot tray 222 to augment an experience of the robot tray. Further, the widgets 224 enable a user to perform a function or access a service that corresponds to the process list 232 and the configuration 228. The widgets 224 can also enable a user to load the robot 227, the local robotic process 226, and/or other custom content (e.g., by or for a user). Examples of the widgets 224 can include, but are not limited to, RPAs, links, tasks, software products, applications, or components of an interface, along with plug-ins and add-ins.

For example, the robot tray 222 enables a user can curate the RPA workflows and/or the widgets 224 to link to other RPA workflows and/or widgets and the canvases 223 also enable the user to dynamically create shortcuts, such as shortcuts for different business units having a same process Note that the robot 227 can be an example of a discrete copy of code of the robot 237, and the local robotic process 226 is an example of a discrete copy of code of the robotic process 234.

The robot 227 can be an application, applet, script, or the like, that may automate a UI transparent to an underlying operating system (OS) or hardware, as described herein. The configuration(s) 228 can store parameters and initial settings as one or more input arguments, which are generally used by the robotic process engine 220 to execute any local RPA workflows (e.g., the robot 227 and the local robotic process 226). The configuration(s) 228 can be in a HTML format. The configuration(s) 228 can be stored in a location (e.g., on the computing device 210) that can be accessed by one or more users, depending on a requirement of the one or more users, such as users who belong to same team can access a same configuration 228 on the computing device 210. In some cases, when the robotic process 234 is stored by the orchestrator 242, the robotic process 234 can be accessed by multiple users and used to generate the configurations 228 and the local robotic processes 226 locally (e.g., on the computing device 210).

The process list 232 can include an itemization of all the RPA workflows (e.g., the robotic process 234 and the robot 237) on the computing platform 230 and available to the orchestrators 242 and the robotic process engine 220. The robotic process 234 can be a robotic process, ad/or RPA workflow originated from the computing platform 230 with default values associated therewith. The robot 237 (e.g., like the robot 227) can be an application, applet, script, or the like, that may automate a UI transparent to an underlying operating system (OS) or hardware, as described herein. Thus, the robotic process 234 and the robot 237 can be RPA workflows built at or within the computing platform 230. For example, the computing platform 230 stores one or more RPA workflows (e.g., including the process 234 and the robot 237), which are further distributed by the computing platform 230. In an embodiment, the robotic process 234 (e.g., or the robot 237) includes one or more input fields, which are a mechanism to add or edit properties within the robotic process 234 via one or more input arguments. The one or more input arguments can include a value (e.g., such as an initialized variable or literal) and/or an instruction that defines the parameters and initial settings. The input fields can be respective to different types of arguments, such as a text field for a string, complex forms, a number picker, a checkbox for a Boolean operator, and a date picker for a date and time selection, but not limited to input fields exposed.

Turning now to FIG. 3, a block diagram illustrating a process flow 300 is shown according to one or more embodiments. More particularly, the process flow 200 is an example implementation of a specific configuring and tooling robotic process automation method for an improved experience for viewing and using RPA workflows by the robotic process engine 220 of the computing device 210 of FIG. 1.

The process flow 300 begins at block 310, where the robotic process engine 220 generates the robot tray 222. The robot tray 222 and the robotic process engine 220 (which allows orchestrators 242, such as the conductor 104 described herein) to use and reuse the RPA workflows originated from the computing platforms 230. In accordance with one or more embodiments, the robot tray 222 includes at least one canvas 223.

At block 330, the robotic process engine 220 loads at least one process (e.g., the local robotic process 226) within the at least one canvas 223. The robotic process engine 220 outputs the robot tray 222 (e.g., with all items loaded therein) to a display coupled to the computing device 210 (such as on a display 150 of FIG. 1C for user viewing).

In accordance with one or more embodiments, the at least one canvas 223 can be one of or be part of a column, a row, a pane, and a section. A first canvas of the at least one canvas 223 can display any widgets. Further, the first canvas enables users to create a shortcut for different business units having the same RPA workflows. A second canvas of the at least one canvas 223 can display all processes, tasks, and widgets of the robotic process engine 220. The second canvas can be aligned or oriented to the left, right, above, or below of the first canvas.

At block 360, the robotic process engine 220 dynamically configures the at least one canvas 223 based on one or more inputs. The one or more inputs can be user inputs provided to the robot tray 222 via any device (e.g., the keyboard 152 or the control device 154 of FIG. 1). The dynamic configuring includes adding the widget 224 onto the at least one canvas 223 (e.g., based on the one or more inputs, the robotic process engine 220 can load the widget 224). In an example, the widget 224 can enable a shortcut creation for different business units. Further, during the configuring, the widget 224 can be associated with the configuration 228 or a link to a process, a task, or another widget and/or configured to curate and personalize a process, a task, or another widget. In some examples, the robot tray 220 is configured to identify a process, a task, or the widget 224 as a favorite based on the one or more inputs.

In an example, the robot tray 222 provides a first canvas (e.g., a left pane), with a widget 224 therein, and a separate second canvas (e.g., a right pane) for a user to curate and personalize the RPA workflows, while in a third canvas (e.g., a bottom pane) every RPA workflow pushed by the orchestrators 242 is displayed. According to an embodiment, in the second canvas, only a set of RPA workflows that were 'favorited' by the user are displayed.

Figure 4:
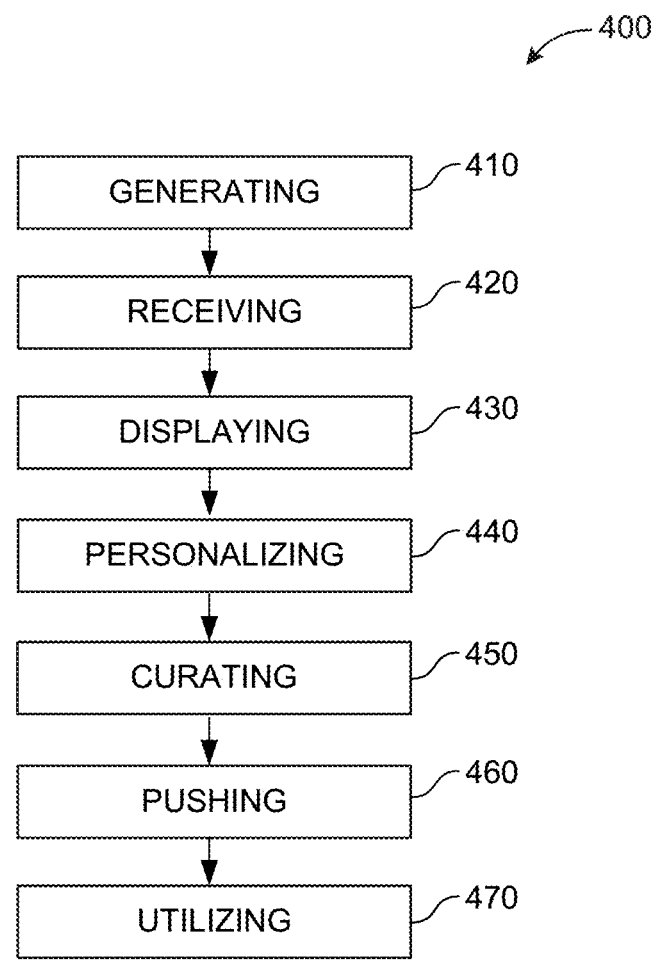
FIG. 4 is a block diagram illustrating a process flow executed by a robotic process engine according to one or more embodiments.

Turning now to FIGS. 4-8, components and operations of the robotic process engine are described according to one or more embodiments. Turning to FIG. 4, a block diagram illustrating a process flow 400 executed by the system 200 of FIG. 2 according to one or more embodiments. The process flow 400 is described with respect to FIGS. 2 and 5-7 by way of example.

The process flow 400 begins at block 410, where the robotic process engine 220 generates the robot tray 222 including at least one canvas 223. At block 420, the robotic process engine 220 acquires (e.g., downloads or receives) discrete copies of code of the RPA workflows with respect to the process list 232. At block 430, the robotic process engine displays the robot tray 222 and the acquired RPA workflows of the process list 232. From this robot tray 222, the user can directly access the acquired RPA workflows.

FIG. 5 shows an interface 500 according to one or more embodiments. The interface 500 is an example of the robot tray 222. The interface 500 includes a header 510, a canvas 520, a canvas 530, and widgets 540. The header 510 can show a main widget/tab of the entire robot tray 222 that allows users to run and manage the RPA workflows. Note that widgets can be located across the entirety of the robot tray 222 (e.g., whether within the canvases 520 and 530 or the header 510). As an example, any widgets/tabs in the header 510 can at least act as bookmarks that enable navigation from the header 510. As another example, widgets 540 can also be loaded within either canvas 520 and 530 such that multiple widgets 540 can co-exist in a single canvas (e.g., to enable one or more advantages, technical effects, and/or benefits of threading different interface experiences together, such as content from different systems, into a single view.

In the canvas 520 (in a left pane), the robot tray 520 provides/displays a list with all the acquired RPA workflows that are accessible through the robot tray 222. In some embodiments, this list can reflect or embodies the process list 232. Further, the acquired RPA workflows can be grouped (e.g., by the orchestrator 242 or centrally administered) in folders, such as an operation folder or an information technology (IT) folder. A user can select (e.g., go on) any of the acquired RPA workflows and perform operations, such as the operations shown in FIG. 6 described herein (e.g., run, read description, configure, pin to a launchpad/dashboard).

At block 440, the robotic process engine 220 personalizes the widgets 224 within the robot tray 222 and the robot tray 222 itself. According to one or more embodiments, a user can personalize the robot tray 222 by adding shortcuts/widgets 224 in the right canvas 223 that can redirect the users to software products by providing links to buttons in the robot tray 222. At block 450, based on one or more inputs from a user, the robotic process engine 220 curates the acquired RPA workflows. Returning to FIG. 5, in the canvas 530 (in a right pane), the robot tray 520 provides/displays a curated list of the acquired RPA workflows. The curated list can be curated by the user for the user and is not centrally administered. In operation, a user can browse the list of the canvas 520, choose any of the acquired RPA workflows (e.g., a "most used" process or identify RPA workflows as 'favorite' process), and pin the chosen to the curated list of the canvas 530. Further, the user can create groups of processes and sort them as needed.

With respect to personalizing and/or curating, FIG. 6 illustrates an interface 600 according to one or more embodiments. The interface 600 is an example of a portion of the robot tray 222 in operation. The interface 600 includes a canvas 620 and a canvas 630. In canvas 620 which is curated centrally by the orchestrator 242, the list is provided with all the acquired RPA workflows that the user can access. In canvas 630, all the actions that users can take regarding personalizing and/or curating are shown in a contextual menu. In an example, when a user wants to curate a list, the user goes to the contextual menu by selecting the "Fill in strong passwords" in the canvas 620 and click the "Pin to launchpad" option, which will make this process available in the canvas 630. If the user wants to remove this process, the user can find this process in the curated list (e.g., the canvas 530 of FIG. 5), open a contextual menu (e.g., that is similar to canvas 630), and click the "Unpin from launchpad" option.

At block 460, the robot tray 222 pushes shortcuts to users based on user activities on the system 200. Note that shortcuts in this context are links to other RPA workflows, widgets, and/or other products associated with the robotic process engine 220. For example, while the robotic process engine 220 may only show processes pinned by the user, when a new product is integrated with the robotic process engine 220, the robot tray 222 can show content started by the user in these product, a last project opened in the new product, and a last 5 reviews on the content.

At block 470, the robotic process engine 220 utilizes the robot tray 222 to perform launch pad operations. From a launchpad of either the list of the canvas 520 or the curated list of the canvas 530, a user can start, customize, and view a process. In this way, from the robot tray 222, the user can explore other software products without opening these products (e.g., the robot tray 222 acts as a browser). FIG. 7 shows an interface according to one or more embodiments. The interface of FIG. 7 shows a header 710 (e.g., a header control with spacing widgets/tabs) of the robot tray 222. This header 710 can be seen in place of the header 510 of FIG. 5. Note that with the interface 500 of FIG. 5, the header 510 can have more widgets/tabs than a main widget/tab. As shown by the interface of FIG. 7, the header 710 includes the following widgets: home 720, automation hub 730, action center 740, task mining 750, reminders 760, and notifications 770. Each of these widgets/tabs 720, 730, 740, 750, 760, and 770 provides a different view of the robot tray 222 with different features. Also, the header 710 is extensible and allows custom widgets/tabs to be build and added. Each new widget/tab would have a new entry in the header 710. From the header 710, a user can switch between different canvas combinations of the robot tray 222, each providing its own set of capabilities. Turning to FIG. 8, an interface flow 800 (e.g., different screens/states of the robot tray 222) is shown according to one or more embodiments. At interface 810, a state is shown where the robot tray 220 is collapsed to only show the acquired RPA workflows. At arrow 820, the robot tray 222 through a process details canvas, which provides a description of a process, is configured. At interface 830, a state is shown where the robot tray 220 is collapsed to only show the curated list, including at least the widget with respect to the configuration of arrow 820. Note that the robot tray 222 can also provide both interfaces 810 and 839 in conjunction, with all configurations of the arrow 820 being shown in real time.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing system comprising:
at least one memory configured to store processor executable instructions for a robotic process engine; and
at least one processor operatively coupled to the memory, wherein the at least one processor is configured to execute the robotic process engine to cause the computing system to:
generate, by the robotic process engine, a robot tray comprising at least one canvas and one or more widgets, the at least one canvas comprising a first canvas and a second canvas, the first canvas displaying the one or more widgets including a widget being associated with a configuration and a link, and the second canvas displaying at least processes and tasks of the robotic process engine,
wherein the widget is a separate code created outside of the robot tray to augment an experience of the robot tray, and
wherein the configuration comprises one or more parameters and one or more initial settings as one or more input arguments to one or more robotic process automation workflows; and
dynamically and automatically configure, by the robotic process engine without user input, the at least one canvas, based on one or more inputs comprising discrete copies of code of the one or more robotic process automation workflows and a process list from a computing platform external to the computing system, the process list comprising an itemization of the one or more robotic process automation workflows on the computing platform and available to the robotic process engine that correspondingly specify one or more robots or robotic processes, the robot tray utilizing the process list to provide functionalities to and extend functionalities of the one or more robots or robotic processes, and the robot tray and the one or more widgets providing a software experience without directly opening one or more software products associated with the one or more robots or robotic processes,
wherein the dynamic configuring includes adding the one or more widgets representing the one or more robotic process automation workflows of the process list onto the first canvas and adding onto the second canvas a list with acquired robotic process automation workflows accessible through the robot tray, and wherein the list groups the acquired robotic process automation workflows in one or more folders.

2. The computing system of claim 1, wherein the at least one processor is configured to execute the robotic process engine to cause the computing system to output the robot tray to a display coupled to the computing system.

3. The computing system of claim 1, wherein the at least one canvas is one of a column, row, pane, and section.

4. The computing system of claim 1, wherein the widget is configured to curate and personalize a process, a task, or another widget.

5. The computing system of claim 1, wherein the widget enables shortcut creation for different business units.

6. The computing system of claim 1, wherein the robot tray is configured to identify a process, a task, or the widget as a favorite based on the one or more inputs.

7. The computing system of claim 1, wherein the robotic process engine loads within the at least one canvas at least one process.

8. The computing system of claim 1, wherein the configuration or link corresponds to a process, a task, or another widget, wherein the second canvas is aligned left of the first canvas.

9. The computing system of claim 1, wherein the robotic process engine automatically personalizes the widget for a user to redirect the user to a software by providing one or more links to one or more buttons in the robot tray.

10. The computing system of claim 1, wherein the first canvas presents the widget in a grid.

11. The computing system of claim 1, wherein the discrete copies of code of one or more robotic process automation workflows comprise a local robotic process of the computing system.

12. The computing system of claim 1, wherein the one or more robotic process automation workflows comprise one or more unattended robotic process automation performed without user inputs or control.

13. The computing system of claim 1, wherein the widget is associated with the configuration or link and comprises a separate code created outside of the robot tray to augment the software experience without directly opening the one or more software products associated with the one or more robots or robotic processes.

14. The computing system of claim 1, wherein the robot tray provides the functionalities to and extends the functionalities of the one or more robots or robotic processes dynamically to initiate and monitor the one or more robots or robotic processes by the robotic process engine.

15. The computing system of claim 1, wherein the robot tray comprises a user interface that visually displays one or more shapes in multiple dimensions for development and runtime of the one or more robots or the robotic processes in relation to a computer vision operation or machine learning model.

16. The computing system of claim 1, wherein the configuration or the link stores the one or more parameters and the one or more initial settings as one or more input arguments.

17. The computing system of claim 1, wherein the robot tray pushes one or more shortcuts to users based on one or more user activities.

18. A method implemented by processor executable instructions for a robotic process engine, the processor executable instructions stored on at least one memory that is communicatively coupled to at least one processor, the method comprising:
  generate, by the robotic process engine, a robot tray comprising at least one canvas and one or more widgets, the at least one canvas comprising a first canvas and a second canvas, the first canvas displaying the one or more widgets including a widget being associated with a configuration and a link, and the second canvas displaying at least processes and tasks of the robotic process engine,
  wherein the widget is a separate code created outside of the robot tray to augment an experience of the robot tray, and
  wherein the configuration comprises one or more parameters and one or more initial settings as one or more input arguments to one or more robotic process automation workflows; and
  dynamically and automatically configure, by the robotic process engine without user input, the at least one canvas, based on one or more inputs comprising discrete copies of code of the one or more robotic process automation workflows and a process list from a computing platform external to the computing system, the process list comprising an itemization of the one or more robotic process automation workflows on the computing platform and available to the robotic process engine that correspondingly specify one or more robots or robotic processes, the robot tray utilizing the process list to provide functionalities to and extends functionalities of the one or more robots or robotic processes, and the robot tray and the one or more widgets providing a software experience without directly opening one or more software products associated with the one or more robots or robotic processes,
  wherein the dynamic configuring includes adding the one or more widgets representing the one or more robotic process automation workflows of the process list onto the first canvas and adding onto the second canvas a list with acquired robotic process automation workflows accessible through the robot tray, and
  wherein the list groups the acquired robotic process automation workflows in one or more folders.

19. The method of claim 18, wherein the at least one processor is configured to execute the robotic process engine to cause the computing system to output the robot tray to a display coupled to the computing system.

* * * * *